(12) United States Patent
Hwang

(10) Patent No.: US 10,088,092 B2
(45) Date of Patent: Oct. 2, 2018

(54) THERMAL INSULATION SHEET, HYBRID THERMAL INSULATION SHEET, AND THERMAL INSULATION PANEL

(71) Applicant: AMOGREENTECH CO., LTD., Gimpo-si (KR)

(72) Inventor: Seung Jae Hwang, Incheon (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 327 days.

(21) Appl. No.: 14/902,078

(22) PCT Filed: Jul. 4, 2014

(86) PCT No.: PCT/KR2014/006018
§ 371 (c)(1),
(2) Date: Dec. 30, 2015

(87) PCT Pub. No.: WO2015/002505
PCT Pub. Date: Jan. 8, 2015

(65) Prior Publication Data
US 2016/0369936 A1    Dec. 22, 2016

(30) Foreign Application Priority Data

Jul. 5, 2013 (KR) ........................ 10-2013-0079081
Aug. 19, 2013 (KR) ........................ 10-2013-0097860
(Continued)

(51) Int. Cl.
*F16L 59/02* (2006.01)
*B32B 3/30* (2006.01)
(Continued)

(52) U.S. Cl.
CPC .............. *F16L 59/029* (2013.01); *B32B 3/30* (2013.01); *B32B 27/06* (2013.01); *E04B 1/80* (2013.01);
(Continued)

(58) Field of Classification Search
CPC .... F16L 59/029; E04B 1/80; E04B 2001/742; E04B 1/803; B32B 27/06; B32B 3/30;
(Continued)

(56) References Cited

U.S. PATENT DOCUMENTS

2001/0008671 A1* 7/2001 Kuroda ................ F16L 59/065
428/69
2005/0256241 A1* 11/2005 Sachdev .................. C08K 3/08
524/439
(Continued)

FOREIGN PATENT DOCUMENTS

JP        1996233193       9/1996
KR       20080054235       6/2008
(Continued)

OTHER PUBLICATIONS

International Search Report—PCT/KR2014/006018 dated Oct. 28, 2014.

*Primary Examiner* — James C Yager
(74) *Attorney, Agent, or Firm* — Cantor Colburn LLP

(57) ABSTRACT

Provided are a heat insulation sheet, a hybrid heat insulation sheet including the heat insulation sheet, and a heat insulation panel having the hybrid heat insulation sheet. The heat insulation sheet includes: an outer shell with a hollow portion therein; and a phase change material (PCM) that is positioned in the hollow portion and that absorbs heat transferred from the outer shell.

10 Claims, 13 Drawing Sheets

(30) Foreign Application Priority Data

Oct. 14, 2013 (KR) .................. 10-2013-0122009
Jul. 4, 2014 (KR) .................. 10-2014-0083614

(51) Int. Cl.
| | | |
|---|---|---|
| B32B 27/06 | (2006.01) | |
| E04B 1/80 | (2006.01) | |
| B32B 15/14 | (2006.01) | |
| B32B 5/02 | (2006.01) | |
| B32B 5/08 | (2006.01) | |
| B32B 5/26 | (2006.01) | |
| B32B 7/02 | (2006.01) | |
| B32B 7/12 | (2006.01) | |
| B32B 15/18 | (2006.01) | |
| B32B 15/20 | (2006.01) | |
| B32B 27/12 | (2006.01) | |
| B32B 27/30 | (2006.01) | |
| B32B 27/32 | (2006.01) | |
| B32B 27/34 | (2006.01) | |
| B32B 27/36 | (2006.01) | |
| B32B 3/04 | (2006.01) | |
| B32B 3/06 | (2006.01) | |
| E04B 1/74 | (2006.01) | |

(52) U.S. Cl.
CPC . *B32B 3/04* (2013.01); *B32B 3/06* (2013.01); *B32B 5/022* (2013.01); *B32B 5/08* (2013.01); *B32B 5/26* (2013.01); *B32B 7/02* (2013.01); *B32B 7/12* (2013.01); *B32B 15/14* (2013.01); *B32B 15/18* (2013.01); *B32B 15/20* (2013.01); *B32B 27/12* (2013.01); *B32B 27/304* (2013.01); *B32B 27/306* (2013.01); *B32B 27/32* (2013.01); *B32B 27/34* (2013.01); *B32B 27/36* (2013.01); *B32B 2250/40* (2013.01); *B32B 2250/44* (2013.01); *B32B 2255/02* (2013.01); *B32B 2255/10* (2013.01); *B32B 2255/205* (2013.01); *B32B 2255/26* (2013.01); *B32B 2262/023* (2013.01); *B32B 2262/0238* (2013.01); *B32B 2262/0246* (2013.01); *B32B 2262/0253* (2013.01); *B32B 2262/0292* (2013.01); *B32B 2262/04* (2013.01); *B32B 2262/101* (2013.01); *B32B 2262/106* (2013.01); *B32B 2262/108* (2013.01); *B32B 2262/14* (2013.01); *B32B 2264/102* (2013.01); *B32B 2264/108* (2013.01); *B32B 2264/12* (2013.01); *B32B 2307/304* (2013.01); *B32B 2307/732* (2013.01); *B32B 2419/04* (2013.01); *B32B 2607/02* (2013.01); *E04B 1/803* (2013.01); *E04B 2001/742* (2013.01)

(58) Field of Classification Search
CPC .............. B32B 5/08; B32B 2262/0238; B32B 2607/02; B32B 2419/04; B32B 2307/772; B32B 2264/12; B32B 2264/108; B32B 2264/102; B32B 2262/14; B32B 2262/108; B32B 2262/106; B32B 2262/101; B32B 2262/04; B32B 2262/0292; B32B 2262/253; B32B 2262/0246; B32B 5/022; B32B 2262/023; B32B 2255/26; B32B 2255/205; B32B 2255/10; B32B 2255/02; B32B 2250/44; B32B 2250/40; B32B 3/06; B32B 27/36; B32B 27/34; B32B 27/32; B32B 27/306; B32B 27/304; B32B 27/12; B32B 15/20; B32B 15/18; B32B 7/12; B32B 7/02; B32B 5/26; B32B 15/14; B32B 2307/304
See application file for complete search history.

(56) References Cited

U.S. PATENT DOCUMENTS

2010/0003877 A1* 1/2010 Fan .................. B32B 5/022
442/132
2011/0120040 A1* 5/2011 Alderman .............. B32B 3/08
52/309.13

FOREIGN PATENT DOCUMENTS

| KR | 20100126624 | 12/2010 |
| KR | 20110015326 | 2/2011 |
| KR | 20110061675 | 6/2011 |
| KR | 20110077859 | 7/2011 |
| KR | 20110089470 | 8/2011 |
| KR | 200465140 | 2/2013 |

* cited by examiner

PRE-AIR DRY ZONE

THERMAL INSULATION SHEET, HYBRID THERMAL INSULATION SHEET, AND THERMAL INSULATION PANEL

TECHNICAL FIELD

The present invention relates to a heat insulation sheet, and more specifically, to a heat insulation sheet including a phase change material to absorb heat, a hybrid heat insulation sheet that is obtained by hybridizing the heat insulation sheet with a reinforcing sheet to thus maximize heat barrier efficiency, and a heat insulation panel having the hybrid heat insulation sheet.

BACKGROUND ART

In recent years, energy efficient, environmentally friendly industries are highlighted, and thus various studies are in progress to solve both the energy and environmental problems all over the world.

In particular, technologies for insulation materials are being tried in various ways, in order to reduce the power consumption of refrigerators, and in order to save energy in buildings, in terms of global warming.

Refrigerators consume high power consumption from among consumer electronics products, and thus energy consumption reduction of the refrigerators is indispensable in global warming situations. The power consumption of the refrigerators is determined mostly by the efficiency of compressors for cooling and the heat insulation performance of insulation materials related to heat leakage.

In addition, insulation materials such as mineral wool and polyurethane have been traditionally used as insulation materials for energy savings in buildings. Recently, VIP (Vacuum Insulation Panel), and aerogels are attracting attention, and VIM (Vacuum Insulation Material), DIM (Dynamic Insulation Material) and the like have been studied in future technologies.

VIP and aerogels each having very low heat conductivity may reduce the energy consumption compared to conventional heat insulation materials, and thus have advantages of remarkably expanding a living area. In particular, since the airgel can be made of a translucent and transparent material, the airgel has a very large possibility of being applied to buildings.

Korean Patent Application Publication No. 10-2011-77859 has proposed a vacuum heat insulation material including: a core portion including a core material; and an outer shell material covering the core portion in which and which the core portion is formed under a reduced pressure, wherein the outer shell material is at least one non-woven layer. In this case, the core material of the vacuum insulation material may use glass fiber, polyurethane, polyester, polypropylene or polyethylene, but the pore size of the inner portion of glass fiber aggregates does not have a size suitable for trapping air, exhibiting low heat insulation efficiency. Accordingly, glass fibers may cause problems such as a complex and difficult manufacturing process.

Korean Patent Application Publication No. 10-2011-15326 has proposed a core which is located inside an outer shell of a vacuum insulation material, in which the core is obtained by thermally fusing synthetic resin fibers and bonding the thermally fused synthetic resin fibers to each other. However, since the synthetic resin fibers are heated at a temperature of about a melting point and thermally fused to each other, the synthetic resin fibers become a substantially pore-free non-pore state, to thus have a limit to improve the heat insulation efficiency.

Therefore, the present inventors continue to research to improve heat insulation efficiency and invent and derive structural features of a heat insulation sheet to maximize the heat insulation efficiency, to thereby complete an energy-saving, environment-friendly, more economical, utilizable, and competitive heat insulation sheet according to the present invention.

Technical Problem

To solve the above problems or defects, it is an object of the present invention to provide a heat insulation sheet adopting a heat insulation material including a phase change material to absorb heat, to thereby increase the heat insulation efficiency, a hybrid heat insulation sheet including the heat insulation sheet, and a heat insulation panel having the hybrid heat insulation sheet.

Another object of the present invention is to provide a heat insulation sheet including a phase change material to absorb heat, a hybrid heat insulation sheet that is obtained by hybridizing the heat insulation sheet with a reinforcing sheet to thus maximize heat barrier efficiency, and a heat insulation panel having the hybrid heat insulation sheet.

Another object of the present invention is to provide a heat insulation panel which can improve the heat insulation properties by applying a heat insulation sheet to perform a heat barrier and heat absorption function as a core.

The objects of the present invention are not limited to the above-described objects, and other objects and advantages of the present invention can be appreciated by the following description and will be understood more clearly by embodiments of the present invention.

Technical Solution

To accomplish the above and other objects of the present invention, according to an aspect of the present invention, there is provided a heat insulation sheet comprising: an outer shell with a hollow portion therein; and a phase change material (PCM) that is positioned in the hollow portion and that absorbs heat transferred from the outer shell.

Preferably but not necessarily, the outer shell is made of a heat insulation member to block heat transmitted from the outside or a heat radiation member spreading and radiating the transferred heat.

According to another aspect of the present invention, there is provided a hybrid heat insulation sheet comprising: a heat insulation sheet including an outer shell with a hollow portion therein, and a phase change material (PCM) that is positioned in the hollow portion and that absorbs heat transferred from the outer shell; and at least one reinforcing sheet that is hybridized on one surface, both surfaces or the entire surface of the heat insulation sheet.

Preferably but not necessarily, the hybrid heat insulation sheet further comprises an adhesive that is sandwiched and bonded between the heat insulation sheet and the reinforcing sheet.

Preferably but not necessarily, the adhesive comprises any one of acrylic-based, epoxy-based, aramid-based, urethane-based, polyamide-based, polyethylene-based, EVA-based, polyester-based, and PVC-based adhesives, or a hot melt web, or the adhesive comprises a hot melt powder having a large number of pores formed by accumulating fibers capable of being thermally bonded.

Preferably but not necessarily, the adhesive comprises a conductive filler for thermal spreading of an aspect ratio of 1:100, and a spherical conductive filler for thermal transfer.

Preferably but not necessarily, the reinforcing sheet in the hybrid heat insulation sheet is a heat insulation member or a heat radiation member.

Preferably but not necessarily, the heat insulation member is made of a porous nanofiber web having a microporous structure that is made of a low heat conductivity polymer, and that is integrated with spun nanofibers having a diameter less than 5 μm.

Preferably but not necessarily, the heat radiation member comprises a first radiating layer having a first conductivity; and a second radiating layer having a second conductivity bonded on the first radiating layer, and the first conductivity of the first radiating layer is lower than the second conductivity of the second radiating layer, and the first radiating layer is attached to, contacts or approaches a heat generating component.

Preferably but not necessarily, the heat insulation sheet is formed of a structure that includes a heat spreader to spread the transferred heat, a metal thin plate fixed to the heat spreader, and a phase change material positioned between the heat spreader and the metal thin plate, or a structure that includes a heat spreader to spread the transferred heat, a guide portion fixed to the heat spreader in which at least one through-hole is formed, a phase change material filled in the at least one through-hole of the guide portion, and a metal thin plate surrounding the phase change material and fixed to the guide portion.

According to another aspect of the present invention, there is provided a heat insulation panel comprising: an outer shell with an inner space therein; and a hybrid heat insulation sheet that is arranged in the inner space of the outer shell and for supporting the outer shell, wherein the hybrid heat insulation sheet comprises: a first insulation sheet comprising a phase change material to absorb heat; and a second insulation sheet that is hybridized with the first insulation sheet and is integrated by nanofibers to thus have a porous nanofiber web having a microporous structure.

Advantageous Effects

As described above, the present invention implements a heat insulation sheet including a phase change material to absorb transferred heat to provide an advantage for increasing the heat insulation efficiency.

The present invention provides a hybrid heat insulation sheet that is obtained by hybridizing a heat insulation sheet containing a phase change material with a reinforcing sheet in which heat is primarily blocked or radiated in the reinforcing sheet, and heat is secondarily absorbed in the phase change material having a high heat capacity, to thereby provide an advantage for increasing the heat barrier efficiency.

The present invention provides a vacuum insulation panel (VIP) that uses a heat insulation sheet containing a phase change material or a hybrid heat insulation sheet that is obtained by hybridizing the heat insulation sheet with a reinforcing sheet, as a core, to thereby maximize the heat insulation properties.

The present invention provides an ultra-thin film heat insulation sheet and a heat insulation panel by applying a nanofiber web, to thereby provide excellent heat insulation properties to thus expand inner spaces of refrigerators and buildings.

The present invention implements a heat insulation sheet or panel having excellent heat insulation performance, which may be attached to electronic products of high performance, and simultaneously which may reduce thickness of the heat insulation sheet, to thus provide an effect that the heat insulation sheet or panel can be applied to electronic products including ultra-thin and ultra-slim mobile terminals.

BEST MODE

Figure 1:
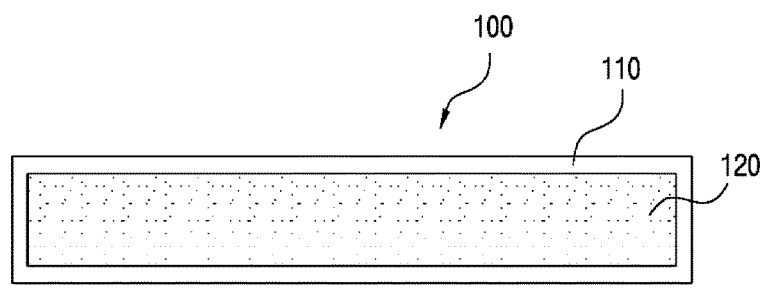
FIG. 1 is a cross-sectional view of a heat insulation sheet according to a first embodiment of the present invention.

Hereinafter, embodiments of the present invention will be described in detail with reference to the accompanying drawings. In the process, the size and shape of the components illustrated in the drawings may be shown exaggerated for convenience and clarity of explanation. Further, by considering the configuration and operation of the present invention, the specifically defined terms can be changed according to user's or operator's intention, or the custom. Definitions of these terms herein need to be made based on the contents across the whole application.

Hereinafter, the detailed structure of the present invention will be described with reference to the accompanying drawings.

Heat insulation sheets and heat insulation panels according to embodiments of the present invention to be described below can be applied to refrigerators and buildings, but the present invention is not limited thereto. In other words, the present invention may be also applied to heat insulation members that are used in other industries.

Figure 2:
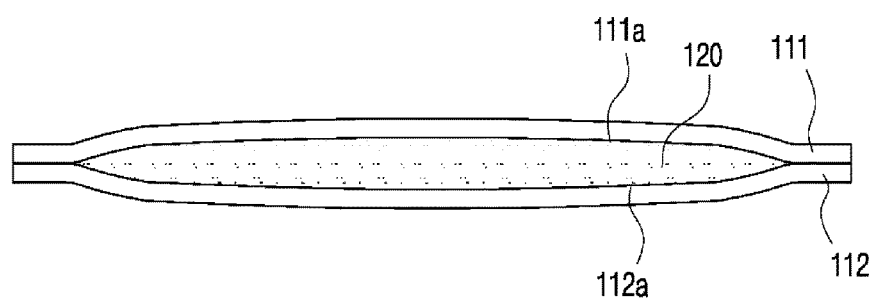
FIG. 2 is a schematic cross-sectional view illustrating a metal outer shell in the heat insulation sheet according to the first embodiment of the present invention.
Figure 3:
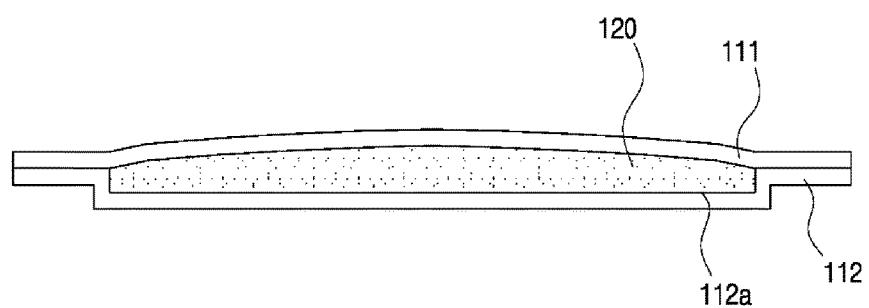
FIG. 3 is a schematic cross-sectional view illustrating a modification of a metal outer shell of the heat insulation sheet according to the first embodiment of the present invention.

Referring to FIGS. 1 to 3, a heat insulation sheet 100 that is applied to a first embodiment of the present invention includes a metal outer shell and a phase change material (PCM) 120.

The metal outer shell has a hollow portion therein, and the phase-change material 120 is positioned in the hollow portion. The phase change material 120 absorbs heat transferred from the metal outer shell. In this way, the heat insulation sheet 100 performs a heat insulation function. That is, once heat is transferred to the phase change material 120, the phase change material 120 absorbs heat to thus perform a heat absorbing reaction to change from a solid phase to a liquid phase. When the ambient temperature falls down, the phase change material 120 is changed back to the solid phase.

As shown in FIG. 1, a metal container 110 with a hollow space is applied as the metal outer shell, and the phase change material 120 is filled in the inner space of the metal container 110, to thereby make a heat insulation sheet, or as shown in FIG. 2, the phase change material 120 is placing in a space that is created by bonding an upper metal sheet 111 and a lower metal sheet 112, to thereby implement a heat insulation sheet. Here, accommodation grooves 111a and 112a that can accommodate the phase change material 120 can be formed in the upper metal sheet 111 and the lower metal sheet 112, respectively, and edges of the upper metal sheet 111 and the lower metal sheet 112 are preferably bonded each other.

The metal sheets that are applied as the metal outer shell have an advantage of reducing thickness of the heat insulation sheet. In FIG. 3, an accommodation groove 112a is formed in only the lower metal sheet 112, and the phase change material is filled in the accommodation groove 112a. Thereafter, the heat insulation sheet is implemented by bonding the upper metal sheet 111 and the lower metal sheet 112, in which it is possible to planarize the top surface and the bottom surface of the heat insulation sheet. Here, the upper surface of the heat insulation sheet may have a convex surface, according to a volume of the phase change material 120 filled in the accommodation groove 112a.

A hybrid heat insulation sheet according to an embodiment of the present invention is defined as a heat insulation member that is obtained by hybridizing at least one reinforcing sheet such as a nanofiber web on one side, both sides or the whole surface of the heat insulation sheet of FIGS. 1 to 3. The nanofiber web is disposed on the outer circumferential surface of the heat insulation sheet and is provided with a plurality of pores trapping air thereby inhibiting convection of the air and insulating heat, to thus block heat primarily. Thus, a capacity of heat delivered from the nanofiber web to the heat insulation sheet is reduced. In the case that the heat that has passed through the nanofiber web is transferred to the heat insulation sheet, the heat is secondarily absorbed by the phase change material of the heat insulation sheet. As a result, the hybrid heat insulation sheet blocks heat in two steps to thus improve heat insulation performance. Here, hybridization is intended to mean a binding relation such as bonding, adhering, lamination, contact, and fixing.

Here, the reinforcing sheet may be a heat insulation member or heat radiation member. The heat insulation sheet and the reinforcing sheet can be bonded with an adhesive interposed between the heat insulation sheet and the reinforcing sheet.

Here, the adhesive may be any one of acrylic-based, epoxy-based, aramid-based, urethane-based, polyamide-based, polyethylene-based, EVA-based, polyester-based, and PVC-based adhesives, or a hot melt web, or the adhesive may be a hot melt powder having a large number of pores formed by accumulating fibers capable of being thermally bonded.

The adhesive may include a conductive filler for thermal spreading of an aspect ratio of 1:100, and a spherical conductive filler for thermal transfer.

Meanwhile, the nanofiber web is arranged in a three-dimensional network structure in which electrospun nanofibers are irregularly stacked. Irregularly distributed micropores are formed in the nanofiber web by the nanofibers, and heat barrier capability of the nanofiber web is increased by the micropores, to thereby have excellent heat insulation performance.

The nanofiber web is formed in a nanofiber web shape having a plurality of pores, by mixing a polymer that can be electrospun with a low heat conductivity with a solvent at a predetermined ratio, to thus create a spinning solution, electrospinning the spinning solution, to thus form nanofibers and accumulating the nanofibers.

As the diameters of the nanofibers are smaller, the specific surface areas of the nanofibers are increased, and the heat barrier ability of the nanofiber web having a plurality of micropores is increased, thereby improving the heat insulation performance.

Nanofibers may formed of, for example, 5 μm or less, preferably formed of a diameter of 1 μm or less, and the nanofiber web made of the nanofibers includes a plurality of micropores, to thus trap air in the inside of the micropores, and inhibit convection of the air trapped in the micropores, to thereby provide excellent heat barrier performance of the transferred heat.

The micropores formed in the nanofiber web are set to several nm to 10 μm or less, preferably, 5 μm or less, and can be implemented by controlling the diameters of the nanofibers.

Here, the spinning method that is applied to the present invention can employ any one selected from general electrospinning, air-electrospinning (AES), electrospray, electrobrown spinning, centrifugal electrospinning, and flash-electrospinning.

For the purpose of improvement of heat resistance of the heat insulation sheet in the present invention, a nanofiber web that is prepared by electrospinning a polymer having low thermal conductivity and excellent heat resistance alone or a mixed polymer that is obtained by mixing a polymer with low thermal conductivity and a polymer with excellent heat resistance at a predetermined mixture ratio, can be applied as the heat insulation sheet.

In this case, it is preferable that the polymer that can be used in the present invention should be dissolved in an organic solvent so as to be spun, and should have low thermal conductivity, and also it is more preferable that the polymer that can be used in the present invention should have excellent heat resistance.

The polymer that can be spun and has a low thermal conductivity may include, for example, polyurethane (PU), polystyrene, polyvinyl chloride, cellulose acetate, polyvinylidene fluoride (PVDF), polyacrylonitrile (PAN), polymethyl methacrylate, polyvinyl acetate, polyvinyl alcohol, polyimide, or the like.

Further, the polymer having excellent heat resistance performance is a resin that can be dissolved in an organic solvent for electrospinning and whose melting point is 180° C. or higher, and may employ, for example, any one selected from the group consisting of: aromatic polyester containing at least one of polyacrylonitrile PAN, polyamide, polyimide, polyamide-imide, poly meta-phenylene iso-phthalamide, polysulfone, polyether ketone, polyethylene terephthalate, polytrimethylene terephthalate, and polyethylene naphthalate; polyphosphazenes containing at least one of polytetrafluoroethylene, polydiphenoxy phosphazene, and poly {bis [2-2-methoxyethoxy phosphazene]}; polyurethane copolymer containing at least one of polyurethane and polyether urethane; cellulose acetate, cellulose acetate butyrate, and cellulose acetate propionate.

The thermal conductivity of the polymer is preferably set to less than 0.1 W/mK.

Since it is known that the polyurethane (PU) of the polymer materials has thermal conductivity of 0.016~0.040 W/mK and the polystylene (PS) and the polyvinylchloride (PVC) have thermal conductivity of 0.033~0.040 W/mK, the nanofiber webs that are obtained by spinning the polyurethane (PU), the polystylene (PS) and the polyvinylchloride (PVC) have also low thermal conductivity.

The thickness of the nanofiber web can be set to have a thickness of 5 μm-50 μm, preferably to have a thickness of 10 μm-30 μm.

In addition, the nanofiber web may be stacked into a multi-layer and thus may be produced so as to have a variety of thicknesses. That is, the heat insulation sheet of the nanofiber web that is applied to the present invention may have high heat insulation performance while being made of an ultra-thin structure.

The solvent is at least one selected from the group consisting of DMA (dimethyl acetamide), DMF (N, N-dimethylformamide), NMP (N-methyl-2-pyrrolidinone), DMSO (dimethyl sulfoxide), THF (tetra-hydrofuran), DMAc (di-methylacetamide), EC (ethylene carbonate), DEC (diethyl carbonate), DMC (dimethyl carbonate), EMC (ethyl methyl carbonate), PC (propylene carbonate), water, acetic acid, and acetone.

The nanofiber web is prepared by the electrospinning method, and thus thickness of the nanofiber web is determined according to a spinning dose of a spinning solution. Accordingly, it is easy to have the nanofiber web made into a desired thickness.

As described above, since the nanofiber web is formed into a nanofiber web shape in which nanofibers are accumulated by a spinning method, the nanofiber web can be made of a type having a plurality of pores without a separate process. It is also possible to adjust size of the pores according to a spinning dose of a spinning solution. Thus, since the multiple pores can be finely made, heat barrier performance is excellent, to accordingly improve heat insulation performance.

Meanwhile, in the present invention, inorganic particles that are heat insulation fillers for blocking the heat transfer may be contained in the spinning solution for forming the nanofiber web. In this case, the nanofiber web may contain inorganic particles. The inorganic particles are positioned within the spun nanofiber, or some of the inorganic particles are exposed on the surface of nanofibers, thereby blocking the heat transfer. Further, the inorganic particles can improve intensity of the nanofiber web as the heat insulation filler.

Preferably, the inorganic particles are at least one selected from the group consisting of $SiO_2$, $SiON$, $Si_3N_4$, $HfO_2$, $ZrO_2$, $Al_2O_3$, $TiO_2$, $Ta_2O_5$, $MgO$, $Y_2O_3$, $BaTiO_3$, $ZrSiO_4$, and $HfO_2$, or at least one selected from the group consisting of glass fiber, graphite, rock wool, and clay, but is not necessarily limited thereto. In other words, one selected from the group consisting of the inorganic particles may be contained in the spinning solution alone or a mixture of two or more selected from the group consisting of the inorganic particles may be contained in the spinning solution in a mixture thereof.

Further, fumed silica may be contained in the spinning solution for forming the nanofiber web.

Figure 4:
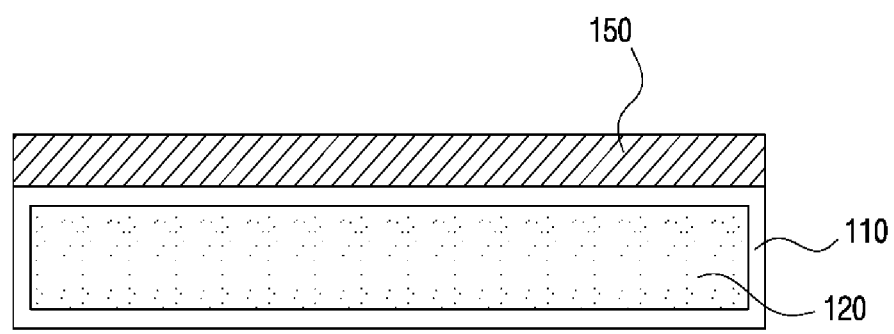
FIG. 4 is a cross-sectional view of a hybrid heat insulation sheet according to the first embodiment of the present invention.
Figure 5:
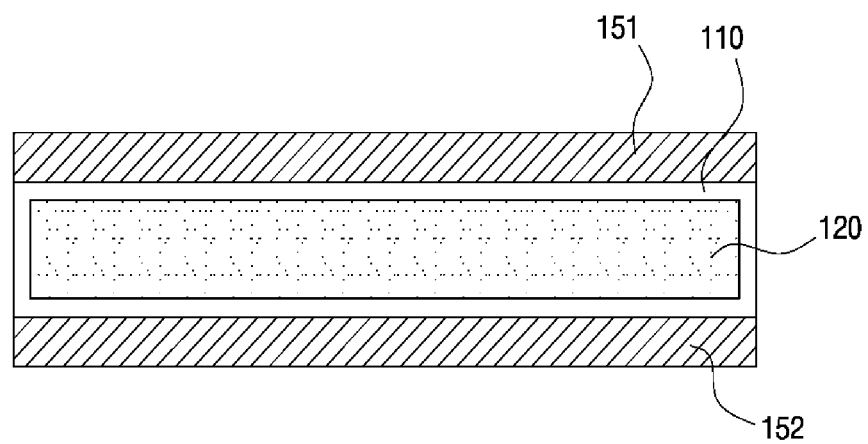
FIG. 5 is a cross-sectional view of a first modification of the hybrid heat insulation sheet according to the first embodiment of the present invention.
Figure 6:
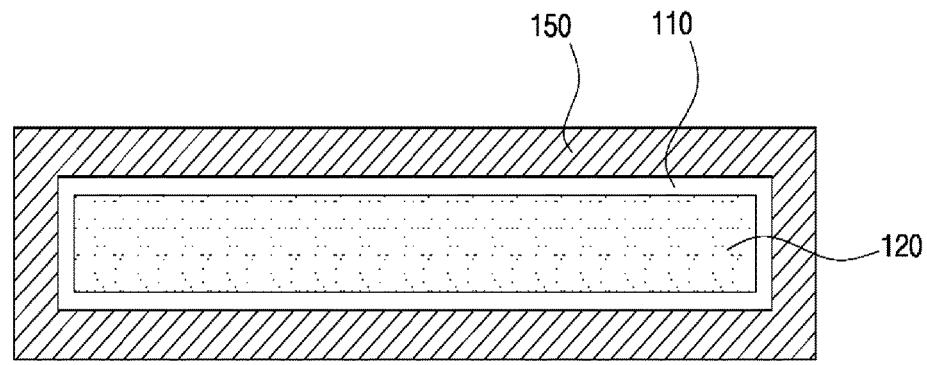
FIG. 6 is a cross-sectional view of a second modification of the hybrid heat insulation sheet according to the first embodiment of the present invention.

Referring to FIGS. 4 to 6, the hybrid heat insulation sheet according to the first embodiment of the present invention can be implemented as a laminate structure of FIG. 4 in which a nanofiber web 150 is laminated on one surface of a metal container 110 of the heat insulation sheet, as a laminate structure of FIG. 5 in which nanofiber webs 151 and 152 are laminated on both surfaces of a metal container 110 of the heat insulation sheet, or as a laminate structure of FIG. 6 in which a nanofiber web surrounds the entire surface of a metal container 110 of the heat insulation sheet.

Figure 7:
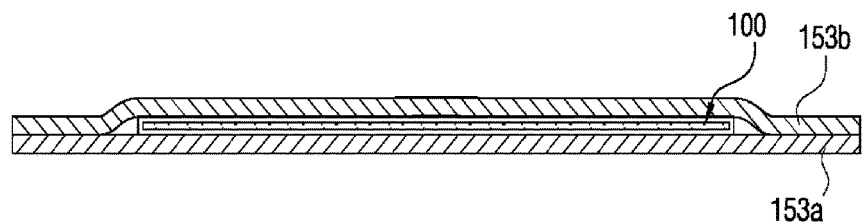
FIG. 7 is a cross-sectional view of a third modification of the hybrid heat insulation sheet according to the first embodiment of the present invention.

As shown in FIG. 7, a third modification of the hybrid heat insulation sheet according to the first embodiment of the present invention can be achieved into a laminated structure of a first nanofiber web 153a, a heat insulation sheet 100 and a second nanofiber web 153b as a nanofiber web, in which the heat insulation sheet 100 is interposed between the first nanofiber web 153a and the second nanofiber web 153b, and then the first nanofiber web 153a and the second nanofiber web 153b are laminated.

The nanofiber web 150 used for the hybrid heat insulation sheet is a plate-shaped folded structure, or a nanofiber web laminate structure in which a plurality of nanofiber web layers are laminated.

In some embodiments of the present invention, a nonwoven fabric is attached to the heat insulation sheet and the nanofiber web to thereby implement the hybrid heat insulation sheet. The available nonwoven fabric is a polyolefin-based porous membrane of a commercially available two-layer or three-layer structure, e.g., a PP/PE or PP/PE/PP membrane or a PP or PE membrane of a single-layer structure, a nonwoven fabric made of PP/PE fibers with a dual structure in which PE is coated on the outer periphery of a PP fiber as a core, or a PET nonwoven fabric made of PET fibers.

Figure 8A:
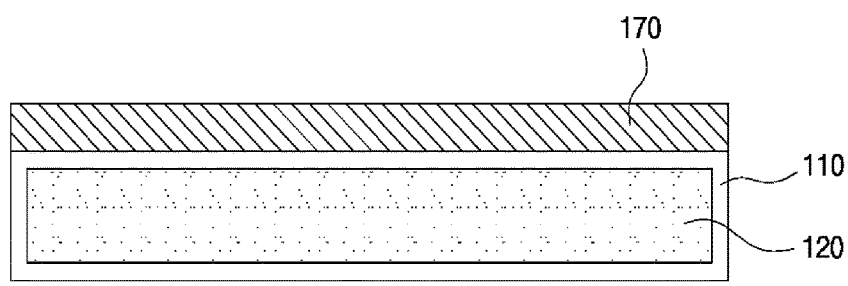
FIGS. 8A through 8C are cross-sectional views of a fourth modification of the hybrid heat insulation sheet according to the first embodiment of the present invention.
Figure 8B:
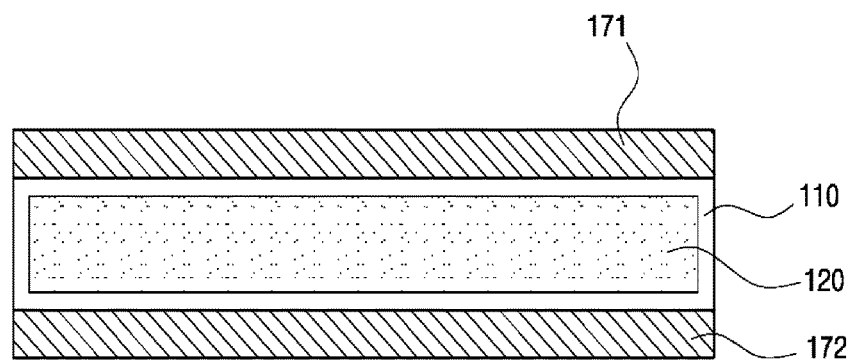
Figure 8C:
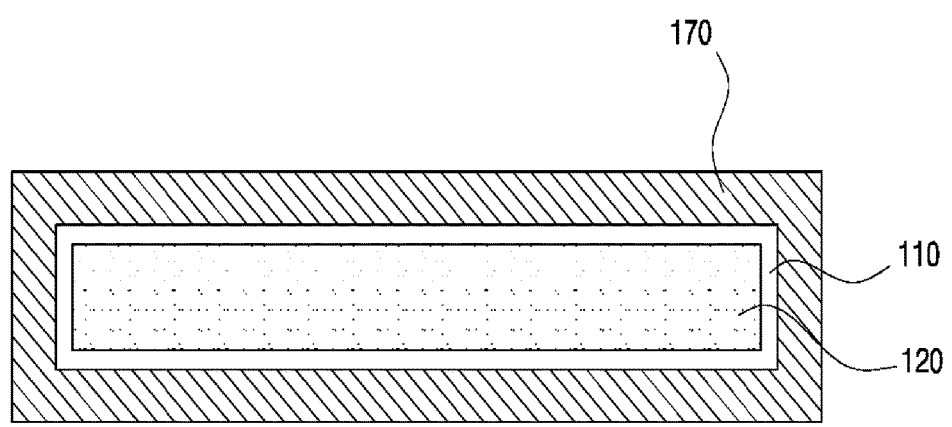

Referring to FIGS. 8A through 8C, the fourth modification of the hybrid heat insulation sheet according to the first embodiment of the present invention can be configured so that a nonwoven fabric 170 can be formed to cover one surface of a metal container 110 of the heat insulation sheet (FIG. 8A), a pair of nonwoven fabrics 171 and 172 can be formed to cover both sides of the metal container 110 (FIG. 8B), and a nonwoven fabric 170 can be formed to surround the entire outer peripheral surface of the metal container 110 (FIG. 8C).

Figure 9:
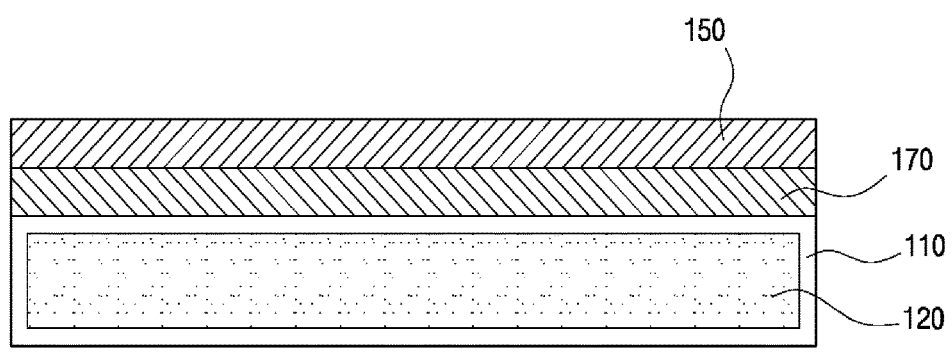
FIG. 9 is a cross-sectional view of a fifth modification of the hybrid heat insulation sheet according to the first embodiment of the present invention.

Referring to FIG. 9, the fifth modification of the hybrid heat insulation sheet according to the first embodiment of the present invention is implemented into a structure that a nonwoven fabric 170 is interposed between the nanofiber web 150 and the heat insulation sheet, in which the nonwoven fabric 170 and the nanofiber web 150 are sequentially laminated on the outer peripheral surface of the metal container 110.

Figure 10:
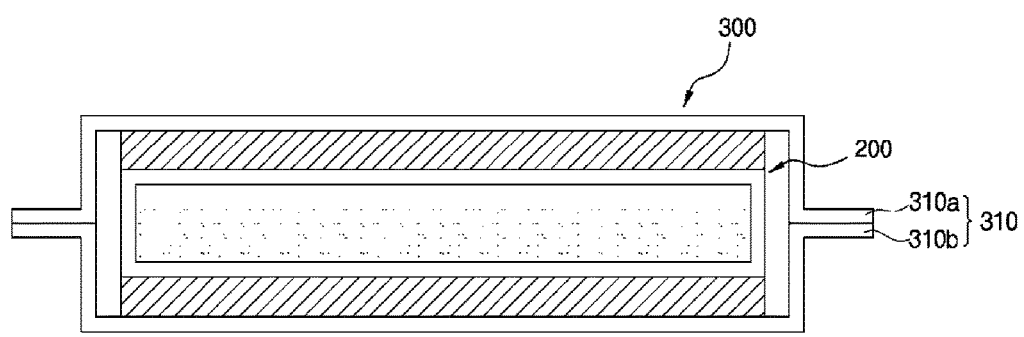
FIG. 10 is a schematic cross-sectional view illustrating a vacuum insulation panel (VIP) according to the first embodiment of the present invention.
Figure 11:
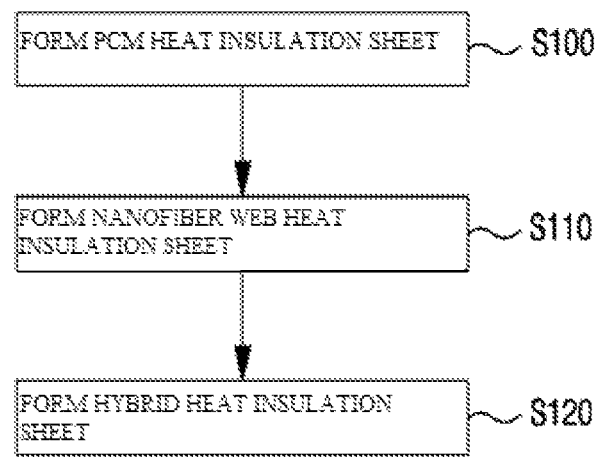
FIG. 11 is a flowchart of a manufacturing method of a vacuum insulation panel according to the first embodiment of the present invention.

FIG. 10 is a conceptual cross-sectional view of a vacuum insulation panel (VIP) according to the first embodiment of the present invention, and FIG. 11 is a flowchart for explaining a manufacturing method of the vacuum insulation panel according to the first embodiment of the present invention.

The above-described heat insulation sheet according to the first embodiment and the hybrid heat insulation sheets according to the first to fifth modifications can be built into a vacuum insulation panel to thereby exert the heat insulation performance.

Referring to FIG. 10, a vacuum insulation panel 300 according to the first embodiment of the present invention includes: an outer shell 310 with gas barrier performance and preferably forming a reduced pressure space therein; and a hybrid heat insulation sheet 200 that is arranged inside the outer shell 310, for supporting the outer shell 310.

The hybrid heat insulation sheet 200 that is applied as a core to the vacuum insulation panel 300 is provided with a porous nanofiber web to thereby include a plurality of micropores capable of trapping air. Accordingly, since the voluntary escape of the air trapped in the micropores is difficult, the hybrid heat insulation sheet 200 exhibits excellent heat insulating performance even if the inside of the outer shell 310 is not in a vacuum state or in a reduced pressure space. Thus, many benefits may be obtained in the case of applying the hybrid heat insulation sheet as a heat insulation member for construction.

Here, the reduced pressure space means a space whose internal pressure is reduced so as to be lower than the atmospheric pressure.

In addition, when the inside of the outer shell 310 is in a vacuum state or in a reduced pressure space in the vacuum insulation panel 300 according to one embodiment of the present invention, a getter member (not shown) that adsorbs moisture and gas may be included in the outer shell 310 or the hybrid heat insulation sheet 200. The getter member includes, for example, an absorbent and a gas adsorbent in the form of a powder, and may be packed with a PP (polypropylene) or PE (polyethylene) nonwoven fabric.

In addition, the getter member may include at least one selected from the group consisting of silica gel, zeolite, activated carbon, zirconium, a barium compound, a lithium compound, a magnesium compound, a calcium compound and calcium oxide.

The getter member which can be used in the embodiments of the present invention is not particularly limited, but may adopt materials that are conventionally used in the field of manufacturing vacuum insulation members.

The outer shell 310 surrounds the hybrid heat insulation sheet 200 that is the core, and serves to keep the inside of the outer shell 310 to be in a reduced pressure or vacuum state. The outer shell 310 is made in the form of an envelope, and sealed by thermally compressing an inlet portion of the outer shell 310 under the vacuum environment after inserting the hybrid heat insulation sheet 200 into the outer shell 310. Accordingly, the outer shell 310 is fabricated and used in an envelope type by sealing the outer portions of three sides of an upper shell 310a and a lower shell 310b, which form a rectangular box shape.

The outer shell 310 to be used in the embodiment of the present invention is not particularly limited, but may adopt materials that are conventionally used in the field of manufacturing vacuum insulation members. The outer shell 310 is preferably made of a metallic material, and is particularly fabricated in an aluminum envelope form. The outer shell 310 that is used in the embodiment of the present invention may include, for example, a sealing layer surrounding the hybrid heat insulation sheet 200; a barrier layer surrounding the sealing layer; and a nonwoven fabric layer or a protective layer surrounding the barrier layer.

The sealing layer used in the embodiment of the present invention surrounds the built-in hybrid heat insulation sheet 200 and is adhered to the core to thus make it possible to keep a panel form, when a sealing (compression) is achieved by a thermo-compression method. The sealing layer to be used in the embodiment of the present invention is not particularly limited, but may employ a film material that can be bonded by the thermo-compression method. For example, the sealing layer that is formed of a thermo-compression bonding layer bonded by the thermo-compression method may include: polyolefin-based resins such as linear low density polyethylene (LLDPE), low density polyethylene (LDPE), very low density polyethylene (VLDPE), and high density polyethylene (HDPE); resins that enable thermo-compression bonding, for example, a polypropylene (PP) film, polyacrylonitrile film, polyethylene terephthalate film, or ethylene-vinyl alcohol copolymer film, etc., other than the polyolefin-based resins, or a mixture thereof.

The barrier layer used in the embodiment of the present invention can serve to surround the sealing layer, maintain the degree of vacuum therein, and block the gas and water vapor from the outside. The barrier layer used in the embodiment of the present invention is not particularly limited, and may employ a laminating film (or a deposition film layer) that is obtained by depositing a metal on a metal foil or a resin film, and the like. The metal to be used in the embodiment of the present invention may include aluminum, copper, stainless steel or iron, but is not limited thereto.

In addition, the deposition film may be formed by depositing a metal such as aluminum, stainless steel, cobalt or nickel, silica, alumina or carbon or the like by using a vapor deposition method or a sputtering method. A general resin film used in the art can be used as the resin film that is used as a base material. In some embodiments of the present invention, it is preferable to use an aluminum deposition film or aluminum foil as the barrier layer.

Moreover, the nonwoven fabric layer serves to surround the barrier layer, and play a role of a protective layer that protects the vacuum insulation member primarily from external impact. In addition, the nonwoven fabric layer can solve the problem that the thermal performance of the heat insulation member decreases due to higher thermal conductivity of the barrier layer. The material of the nonwoven fabric layer may include PP or PTFE (polytetrafluoroethylene).

In addition, a protective layer made of one or two layers to protect the barrier layer can be used in place of the nonwoven fabric layer. The protective layer may be formed of one or more resins selected from the group consisting of polyamide, polypropylene, PET (polyethylene terephthalate), polyacrylonitrile, polyvinyl alcohol, nylon, K-PET, and ethylene vinyl alcohol.

Referring to FIG. 11, a method of manufacturing a hybrid heat insulation sheet according to the first embodiment of the present invention includes: forming a PCM heat insulation sheet (S100); forming a nanofiber web heat insulation sheet (S110), and hybridizing the PCM heat insulation sheet and the nanofiber web heat insulation sheet to thus form the hybrid heat insulation sheet (S120).

Figure 12:
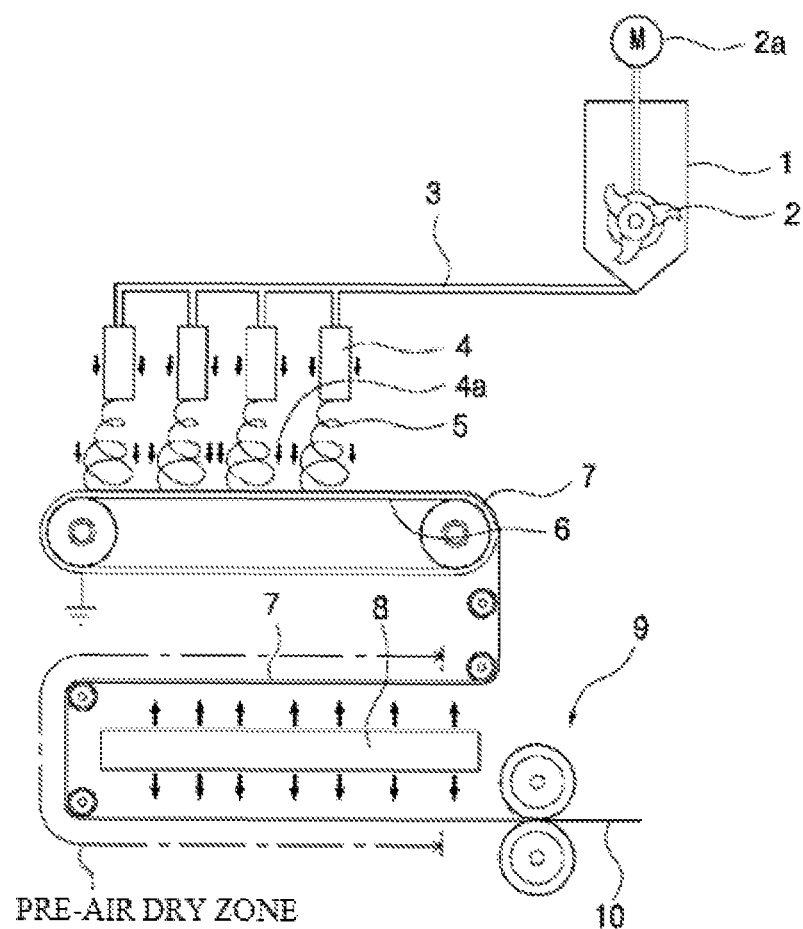
FIG. 12 is a schematic cross-sectional view of an electrospinning apparatus for forming a nanofiber web that is applied to a hybrid heat insulation sheet according to the first embodiment of the present invention.

FIG. 12 is a schematic cross-sectional view of an electrospinning apparatus for forming a nanofiber web that is applied to a hybrid heat insulation sheet according to the first embodiment of the present invention.

Referring to FIG. 12, the electrospinning apparatus includes: a mixing tank 1 having an agitator 2 that uses a mixing motor 2a using a pneumatic pressure as a driving source, so as to prevent phase separation until a polymer material with a low thermal conductivity is mixed with a heat-resistant polymer material in a solvent, and then the mixture is spun; and a number of spin nozzles 4 that are connected with a high-voltage generator (not shown). A polymer spinning solution that is discharged through a number of the spin nozzles 4 that are connected with the mixing tank 1 via a metering pump (not shown) and a transfer tube 3 passes through the spin nozzles 4 that are electrically charged by the high-voltage generator to then be discharged as the nanofibers 5. Thus, the nanofibers 5 are accumulated on the collector 6 that is grounded and is configured in a conveyor belt form that moves at a constant speed, to thereby form porous nanofiber webs 7.

In general, when a multi-hole spin pack (e.g., 245 mm/61 holes) is applied for mass-production, mutual interference between the multi-holes takes place to thus cause fibers to fly to thereby prevent the fibers from being captured. As a result, since a separator (or separation membrane obtained by using the multi-hole spin pack becomes too bulky, it is difficult to form the separator, to thus act to cause a spinning trouble.

In consideration of this, as shown in FIG. 12 in the embodiment of the present invention, the porous nanofiber webs 7 are produced by using the air-electrospinning method in which air 4a is sprayed for each spinning nozzle 4 by using the multi-hole spin pack.

That is, in the embodiment of the present invention, when electrospinning is achieved by using the air-electrospinning method, air is injected from the outer periphery of each of the spin nozzles 4, to thus make the air play a dominant role of capturing and integrating the fibers made of the fast volatile polymer, and to thereby produce nanofiber webs having high rigidity and minimize a spinning trouble that can be caused from the fly of the fibers.

In the embodiment of the present invention, in order to mix a polymer material with a low thermal conductivity and a heat-resistant polymer material to then spin the mixed polymer material, it is preferable to produce a mixture spinning solution by adding the mixed polymer material to a two-component solvent.

The obtained porous nanofiber webs 7 are calendared at a temperature of the melting point of the polymer or below in a calendar device 9, to thus obtain nanofiber webs 10 of thin films used as a core member.

In the embodiment of the present invention, the porous nanofiber webs 7 obtained as above as needed are able to undergo a calendaring process after undergoing a process of adjusting the amount of the solvent and moisture remaining on the surfaces of the nanofiber webs 7, while passing through a pre-air dry zone by a pre-heater 8.

In the pre-air dry zone by the pre-heater 8, air of 20~40° C. is applied to webs by using a fan, and thus the amount of the solvent and moisture remaining on the surfaces of the nanofiber webs 7 is adjusted, to thereby prevent the nanofiber webs 7 from being bulky and to thus play a role of enhancing the strength of the separator and simultaneously adjust porosity of the separator.

In this case, in the case that calendaring is performed at a state the solvent volatilization is too much caused, the porosity is increased but the strength of the nanofiber webs is weak. Reversely, when the solvent volatilization is little caused, a phenomenon of melting the nanofiber webs occurs.

According to the method of forming porous nanofiber webs 10 by using the above-described electrospinning apparatus of FIG. 12, a polymer material with a low thermal conductivity alone, or a mixture polymer that is obtained by mixing a polymer with a low thermal conductivity and a polymer with an excellent heat resistance is dissolved in a solvent to thus prepare a spinning solution. In this case, a predetermined amount of inorganic particles can be added in the spinning solution as needed to reinforce the heat resistance performance. Further, when nanofiber webs are formed by using a polymer material with a low thermal conductivity and an excellent heat resistance, for example, polyurethane (PU), the nanofiber webs have both a heat insulating property and a heat resistance property preferably.

Then, the spinning solution is directly spun on the collector 6, or on the porous substrate 11 such as a nonwoven fabric by using the electrospinning apparatus, to thus produce porous nanofiber webs 10 of a single-layer structure or nanofiber websheets of a multi-layer structure made of the porous nanofiber webs 10 and the porous substrate 11.

Subsequently, when the obtained nanofiber websheets are wide, the nanofiber websheets are cut to a desired width and then are folded a number of times in a plate-like form so as to have a desired thickness or are wound in a plate-like form by a winding machine, or the nanofiber web sheets are cut into a plurality of the core sheets to have a desired shape to then be laminated in multiple layers. Further, after laminating in multiple layers, it is also possible to cut the laminate into a desired shape.

In this case, a plurality of nanofiber websheets laminated as needed are hot or cold compressed preferably to increase a laminating density.

In some embodiments of the present invention, after the fabrication of the nanofiber websheets each having a large area, the nanofiber websheets may be cut and used in a specified shape depending on an intended use such as heat insulation members for the building construction or refrigerators.

Meanwhile, in some embodiments of the present invention, a spinning solution is spun on a transfer sheet made of one of paper, a nonwoven fabric made of a polymer material that is not dissolved in a solvent contained in the spinning solution, and a polyolefin-based film, to thus form porous nanofiber webs, and then nanofiber websheets are fabricated in a manner of laminating the nanofiber webs with the nonwoven fabric while separating the nanofiber webs from the transfer sheet, to thus laminate the resulting nanofiber websheets in a multi-layer stage. It is possible to improve productivity in mass-production of producing the nanofiber webs by using the above transfer sheet.

Figure 13:
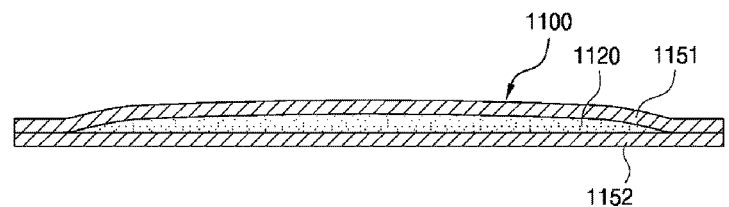
FIG. 13 is a cross-sectional view of a heat insulation sheet according to a second embodiment of the present invention.
Figure 14:
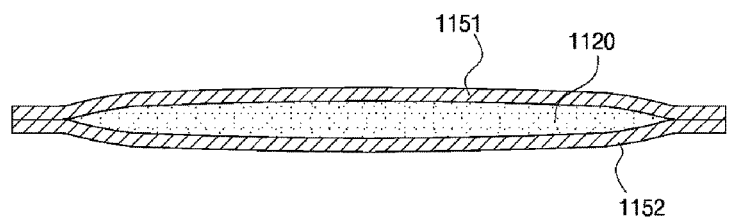
FIG. 14 is a schematic cross-sectional view for explaining the heat insulation sheet according to the second embodiment of the present invention.

FIG. 13 is a cross-sectional view of a heat insulation sheet according to a second embodiment of the present invention, and FIG. 14 is a schematic cross-sectional view for explaining the heat insulation sheet according to the second embodiment of the present invention.

Referring to FIGS. 13 and 14, the heat insulation sheet 1100 according to the second embodiment of the present invention has a structure that a phase change material 1120 is wrapped by nanofiber webs 1151 and 1152. The nanofiber webs 1151 and 1152 perform a function of the outer shell that contains the phase change material 1120.

In other words, the nanofiber webs 1151 and 1152 are arranged on the outer surface of the heat insulation sheet 1100 as the outer shell and the phase change material 1120 is disposed in the inside of the heat insulation sheet 1100 as a core.

The heat that is transferred to the heat insulation sheet 1100 according to the second embodiment of the present invention is first in contact with and transferred to the nanofiber webs 1151 and 1152, to then be blocked by a plurality of micropores and the nanofibers of the nanofiber webs 1151 and 1152. The heat capacity passed to the nanofiber webs 1151 and 1152 has been reduced by the heat capacity blocked in the nanofiber webs 1151 and 1152 to then be passed to the phase change material 1120, and the phase change material 1120 absorbs heat, to thereby substantially increase heat insulation efficiency of the heat insulation sheet 1100 according to the second embodiment of the present invention.

As shown in FIG. 13, when considering a method of manufacturing the heat insulation sheet 1100 according to the second embodiment of the present invention, a structure that the phase change material 1120 is built as the core in the nanofiber webs 1151 and 1152 of the outer shell, can be implemented through a simple production process of placing the phase change material 1120 on the second nanofiber web 1152, and then surrounding the phase change material 1120 by the first nanofiber web 1151, to thereafter fix the first nanofiber web 1151 to the second nanofiber web 1152.

In addition, in FIG. 14, the phase change material 1120 is interposed between the first and second nanofiber webs 1151 and 1152, and then the edge of the first and second nanofiber webs 1151 and 1152 are laminated to thus implement the heat insulation sheet 1100.

Figure 15:
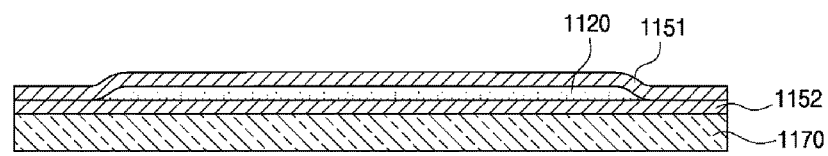
FIG. 15 is a cross-sectional view of a hybrid heat insulation sheet according to the second embodiment of the present invention.
Figure 16:
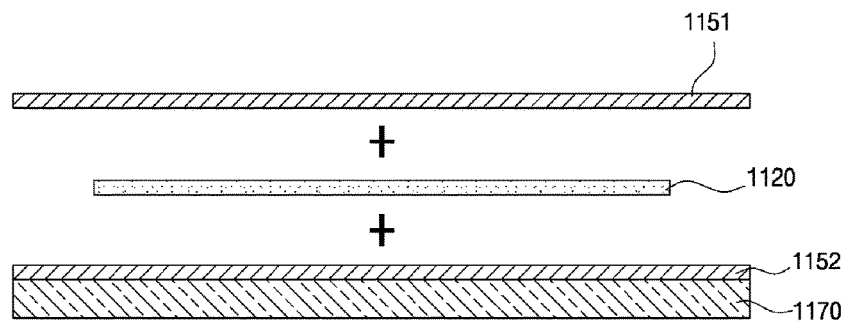
FIG. 16 is a schematic cross-sectional view for explaining a manufacturing method of the hybrid heat insulation sheet according to the second embodiment of the present invention.

FIG. 15 is a cross-sectional view of a hybrid heat insulation sheet according to the second embodiment of the present invention, and FIG. 16 is a schematic cross-sectional view for explaining a manufacturing method of the hybrid heat insulation sheet according to the second embodiment of the present invention.

Referring to FIGS. 15 and 16, the hybrid heat insulation sheet according to the second embodiment of the present invention can be implemented by hybridizing a support 1170 to a heat-insulation sheet of a structure that a phase change material 1120 is surrounded by nanofiber webs 1151 and 1152.

That is, when the support 1170 such as a nonwoven fabric or a woven fabric is hybridized with the second nanofiber web 1152 to thereby reinforce the strength of the hybrid heat insulation sheet. In this case, the second nanofiber web 1152 can be formed by spinning the nanofiber to the support 1170, in which case the phase change material 1120 is placed on the second nanofiber web 1152, and the first nanofiber web 1151 is fixed to the second nanofiber web 1152, to thereby interpose the phase change material 1120 between the first and second nanofiber webs 1151 and 1152.

Figure 17:
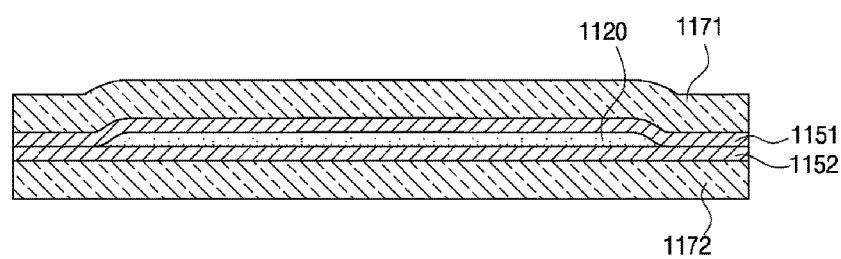
FIG. 17 is a cross-sectional view of a first modification of the hybrid heat insulation sheet according to the second embodiment of the present invention.
Figure 18:
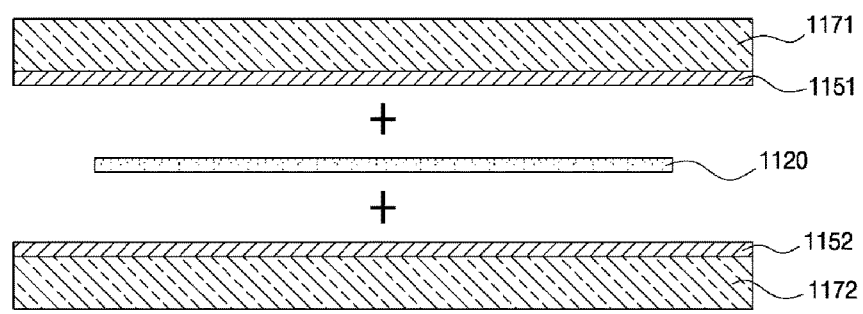
FIG. 18 is a schematic cross-sectional view for explaining the manufacturing method of a second modification of the hybrid heat insulation sheet according to the second embodiment of the present invention.

Further, FIG. 17 is a cross-sectional view of a first modification of the hybrid heat insulation sheet according to the second embodiment of the present invention, and FIG. 18 is a conceptual cross-sectional view for describing a manufacturing method of a second modification of the hybrid heat insulation sheet according to the second embodiment of the present invention.

Referring to FIGS. 17 and 18, a first modification of the hybrid heat insulation sheet according to the second embodiment of the present invention is implemented by preparing a first support 1171 hybridized with a first nanofiber web 1151 and a second support 1172 hybridized with a second nanofiber web 1152, interposing a phase change material 1120 between the first and second nanofiber webs 1151 and 1152, and laminating the first and second supports 1171 and 1172 so as to fix the first and second nanofiber webs 1151 and 1152. Here, the first and second nanofiber webs 1151 and 1152 can be formed by directly spinning nanofibers to each of the first and second supports 1171 and 1172.

Figure 19:
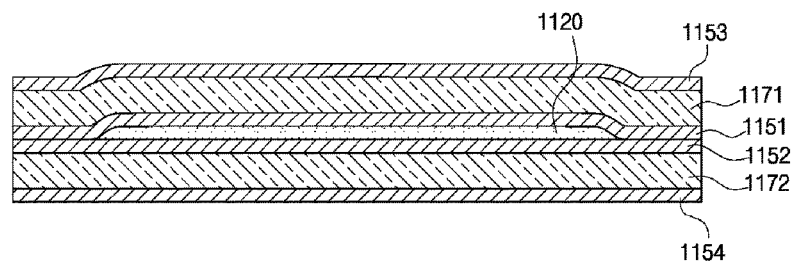
FIG. 19 is a cross-sectional view of a second modification of the hybrid heat insulation sheet according to the second embodiment of the present invention.
Figure 20:
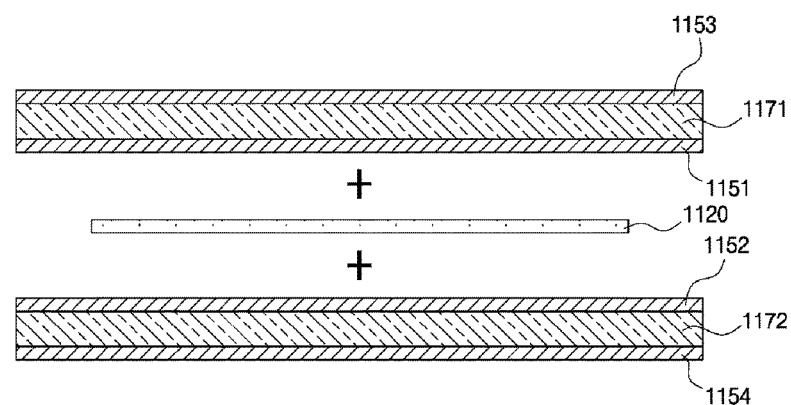
FIG. 20 is a schematic cross-sectional view for explaining the manufacturing method of a third modification of the hybrid heat insulation sheet according to the second embodiment of the present invention.

FIG. 19 is a cross-sectional view of a second modification of the hybrid heat insulation sheet according to the second embodiment of the present invention, and FIG. 20 is a conceptual cross-sectional view illustrating a manufacturing method of the second modification of the hybrid heat insulation sheet according to the second embodiment of the present invention.

Referring to FIGS. 19 and 20, a second modification of the hybrid heat insulation sheet according to the second embodiment of the present invention is implemented by hybridizing first and third nanofiber webs 1151 and 1153 on both sides of a first substrate 1171, hybridizing second and fourth nanofiber webs 1152 and 1154 on both sides of a second support 1172, placing a phase change material 1120 between the first and second nanofiber webs 1151 and 1152, and laminating the first and the second supports 1171 and 1172.

The hybrid heat insulation sheet has a laminated structure of a nanofiber web/a support/a nanofiber web/a phase change material/a nanofiber web/a support/a nanofiber web, to thus increase the strength, as well as to thus block heat from the nanofiber webs of a two layer structure, to thereby reduce the capacity of heat delivered to the phase change material, and improve the heat insulation performance.

The nanofiber webs used for the hybrid heat insulation sheet have a plate-shaped folded structure, or a nanofiber web laminate structure in which a plurality of nanofiber web layers are laminated.

Figure 21:
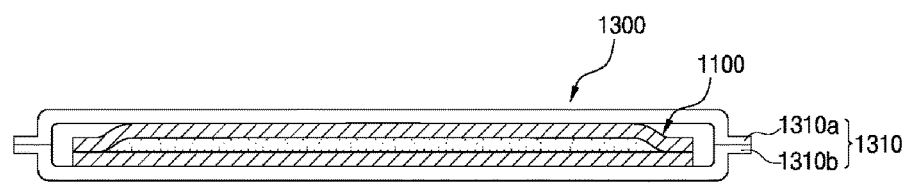
FIG. 21 is a schematic cross-sectional view illustrating a vacuum insulation panel (VIP) according to the second embodiment of the present invention.

FIG. 21 is a conceptual cross-sectional view showing a vacuum heat-insulation panel (VIP) according to the second embodiment of the present invention.

The above-described hybrid heat insulation sheet according to the second embodiment can be built into a heat insulation panel to thereby exert the heat insulation performance.

Referring to FIG. 21, a vacuum insulation panel 1300 according to the second embodiment of the present invention includes: an outer shell 1310 with gas barrier performance and preferably forming a reduced pressure space therein; and a hybrid heat insulation sheet 1100 that is arranged inside the outer shell 1310, for supporting the outer shell 1310.

The hybrid heat insulation sheet 1100 that is applied as a core to the vacuum insulation panel 1300 is provided with a porous nanofiber web to thereby include a plurality of micropores capable of trapping air. Accordingly, since the voluntary escape of the air trapped in the micropores is difficult, the hybrid heat insulation sheet 1100 exhibits excellent heat insulating performance even if the inside of the outer shell 1310 is not in a vacuum state or in a reduced pressure space. Thus, many benefits may be obtained in the case of applying the hybrid heat insulation sheet as a heat insulation member for construction.

Here, the reduced pressure space means a space whose internal pressure is reduced so as to be lower than the atmospheric pressure.

In addition, when the inside of the outer shell 1310 is in a vacuum state or in a reduced pressure space in the vacuum insulation panel 1300 according to one embodiment of the present invention, a getter member (not shown) that adsorbs moisture and gas may be included in the outer shell 1310 or the hybrid heat insulation sheet 1100. The getter member includes, for example, an absorbent and a gas adsorbent in the form of a powder, and may be packed with a PP (polypropylene) or PE (polyethylene) nonwoven fabric.

In addition, the getter member may include at least one selected from the group consisting of silica gel, zeolite, activated carbon, zirconium, a barium compound, a lithium compound, a magnesium compound, a calcium compound and calcium oxide.

The getter member which can be used in the embodiments of the present invention is not particularly limited, but may adopt materials that are conventionally used in the field of manufacturing vacuum insulation members.

The outer shell 1310 surrounds the hybrid heat insulation sheet 1100 that is the core, and serves to keep the inside of the outer shell 1310 to be in a reduced pressure or vacuum state. The outer shell 1310 is made in the form of an envelope, and sealed by thermally compressing an inlet portion of the outer shell 1310 under the vacuum environment after inserting the hybrid heat insulation sheet 1100 into the outer shell 1310. Accordingly, the outer shell 1310 is fabricated and used in an envelope type by sealing the outer portions of three sides of an upper shell 1310a and a lower shell 1310b, which form a rectangular box shape.

The outer shell to be used in the embodiment of the present invention is not particularly limited, but may adopt materials that are conventionally used in the field of manufacturing vacuum insulation members. The outer shell 1310 that is used in the embodiment of the present invention may include, for example, a sealing layer surrounding the hybrid heat insulation sheet 1100; a barrier layer surrounding the sealing layer; and a nonwoven fabric layer or a protective layer surrounding the barrier layer.

The sealing layer used in the embodiment of the present invention surrounds the built-in hybrid heat insulation sheet 1100 and is adhered to the core to thus make it possible to keep a panel form, when a sealing (compression) is achieved by a thermo-compression method. The sealing layer to be used in the embodiment of the present invention is not particularly limited, but may employ a film material that can be bonded by the thermo-compression method. For example, the sealing layer that is formed of a thermo-compression bonding layer bonded by the thermo-compression method may include: polyolefin-based resins such as linear low density polyethylene (LLDPE), low density polyethylene (LDPE), very low density polyethylene (VLDPE), and high density polyethylene (HDPE); resins that enable thermo-compression bonding, for example, a polypropylene (PP) film, polyacrylonitrile film, polyethylene terephthalate film, or ethylene-vinyl alcohol copolymer film, etc., other than the polyolefin-based resins, or a mixture thereof.

The barrier layer used in the embodiment of the present invention can serve to surround the sealing layer, maintain the degree of vacuum therein, and block the gas and water vapor from the outside. The barrier layer used in the embodiment of the present invention is not particularly limited, and may employ a laminating film (or a deposition film layer) that is obtained by depositing a metal on a metal foil or a resin film, and the like. The metal to be used in the embodiment of the present invention may include aluminum, copper, stainless steel or iron, but is not limited thereto.

In addition, the deposition film may be formed by depositing a metal such as aluminum, stainless steel, cobalt or nickel, silica, alumina or carbon or the like by using a vapor deposition method or a sputtering method. A general resin film used in the art can be used as the resin film that is used as a base material. In some embodiments of the present invention, it is preferable to use an aluminum deposition film or aluminum foil as the barrier layer.

Moreover, the nonwoven fabric layer serves to surround the barrier layer, and play a role of a protective layer that protects the vacuum insulation member primarily from external impact. In addition, the nonwoven fabric layer can solve the problem that the thermal performance of the heat insulation member decreases due to higher thermal conductivity of the barrier layer. The material of the nonwoven fabric layer may include PP or PTFE (polytetrafluoroethylene).

In addition, a protective layer made of one or two layers to protect the barrier layer can be used in place of the nonwoven fabric layer. The protective layer may be formed of one or more resins selected from the group consisting of polyamide, polypropylene, PET (polyethylene terephthalate), polyacrylonitrile, polyvinyl alcohol, nylon, K-PET, and ethylene vinyl alcohol.

Figure 22:
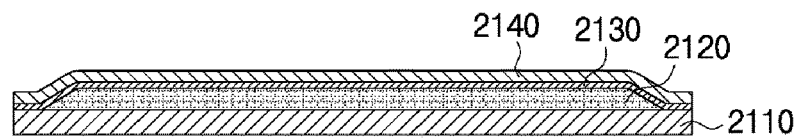
FIG. 22 is a schematic cross-sectional view of a hybrid heat insulation sheet according to a third embodiment of the present invention.
Figure 23A:
FIGS. 23A to 23C are schematic cross-sectional views respectively explaining the manufacturing method of the hybrid heat insulation sheet according to the third embodiment of the present invention.
Figure 23B:
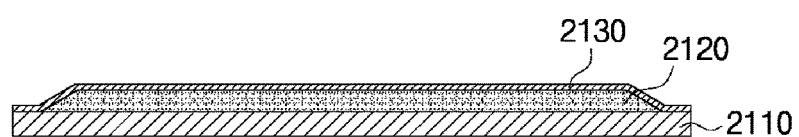
Figure 23C:
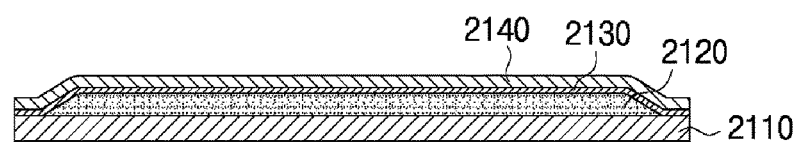

FIG. 22 is a schematic cross-sectional view of a hybrid heat insulation sheet according to a third embodiment of the present invention, and FIGS. 23A to 23C are schematic cross-sectional views respectively explaining the manufacturing method of the hybrid heat insulation sheet according to the third embodiment of the present invention.

Referring to FIG. 22, the hybrid heat insulation sheet according to the third embodiment of the present invention includes: a heat spreader 2110 to diffuse heat that is transferred thereto; a phase change material 2120 to absorb heat saturated from the heat spreader 2110; a cover portion 2130 surrounding the phase change material 2120 and fixed to the heat spreader 2110; and a heat insulator 2140 that blocks heat conducted from the cover portion 2130 to thus perform a heat insulation function.

In such a hybrid heat insulation sheet according to the third embodiment of the present invention, heat is conducted to the heat spreader 2110 from a heat generating component, the heat is spread in the heat spreader 2110, the heat saturated from the heat spreader 2110 is transmitted to the phase change material 2120. The heat delivered to the phase change material 2120 is absorbed by the phase change material 2120. When the heat absorption feature of the phase change material 2120 is saturated, the heat is conducted to the cover portion 2130, and the heat passed to the cover portion 2130 is diffused to then be transferred to the heat insulator 2140. The heat insulator 2140 blocks the conducted heat.

That is, the hybrid heat insulation sheet according to the third embodiment of the present invention is configured to make the heat spreader 2110 spread the conducted heat, the phase change material 2120 absorb the heat, the cover portion 2130 diffuse the heat, and the heat insulator 2140 block the conducted heat, to thus maximize the heat insulation efficiency.

Referring to FIGS. 23A to 23C, the manufacturing method of the hybrid heat insulation sheet according to the third embodiment of the present invention includes preparing a heat spreader 2110 to spread the heat that is passed, and laminating a phase change material 2120 in the heat spreader 2110 (FIG. 23A), surrounding the phase change material 2120, securing the cover portion 2130 to the heat spreader 2110 (FIG. 23B), and laminating the heat insulator 2140 onto the cover portion 2130 (FIG. 23C).

In some embodiments of the present invention, when fixing the cover portion 2130 to the heat spreader 2110, an adhesive can be used, but other fixing units may be applied thereto without being limited thereto. In addition, the phase change material 2120 is located in the center of the heat spreader 2110, the cover portion 2130 is fixed to the edge of the heat spreader 2110, and the phase change material 2120 is contained between the cover portion 2130 and the heat spreader 2110.

The cover portion 2130 blocks the phase change material 2120 that is changed to a liquid phase by heat passed from the heat spreader 2110 from leaking into the micropores of the heat insulator 2140 or to the outside, to thereby bound the phase change material 2120 between the cover portion 2130 and the heat spreader 2110.

Thus, the hybrid heat insulation sheet according to the third embodiment of the present invention is configured to interpose the phase change material 2120 between the cover portion 2130 and the heat spreader 2110, and to fix the cover portion 2130 to the heat spreader 2110, to thus prevent the phase change material 2120 from leaking to the outside or being penetrated into the micropores of the heat insulator 2140 when the phase change material 2120 is changed to a liquid phase due to the endothermic reaction by the transferred heat.

Figure 24:
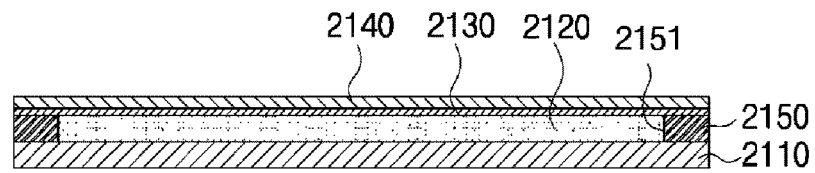
FIG. 24 is a schematic cross-sectional view of a hybrid heat insulation sheet according to a fourth embodiment of the present invention.
Figure 25A:
FIGS. 25A to 25D are schematic cross-sectional views respectively for explaining the manufacturing method of the hybrid heat insulation sheet according to the fourth embodiment of the present invention.
Figure 25B:
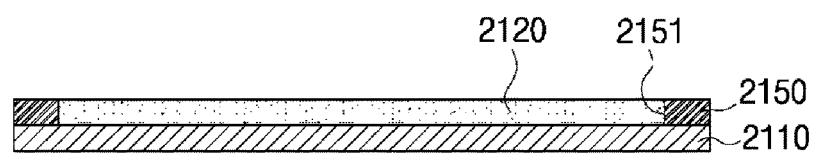
Figure 25C:
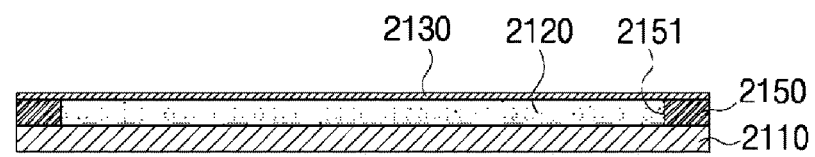
Figure 25D:
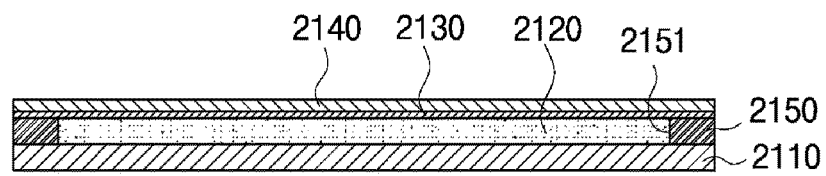
Figure 26:
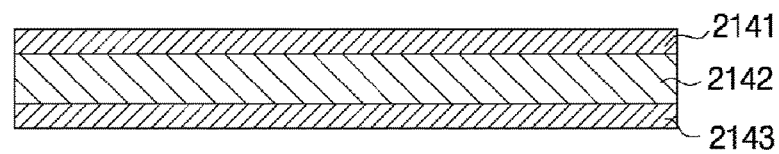
FIG. 26 is a perspective view showing a state where a guide portion is fixed to a heat spreader in the hybrid heat insulation sheet according to the fourth embodiment of the present invention.

FIG. 24 is a schematic cross-sectional view of a hybrid heat insulation sheet according to a fourth embodiment of the present invention, FIGS. 25A to 25D are schematic cross-sectional views respectively for explaining the manufacturing method of the hybrid heat insulation sheet according to the fourth embodiment of the present invention, and FIG. 26 is a perspective view showing a state where a guide portion is fixed to a heat spreader in the hybrid heat insulation sheet according to the fourth embodiment of the present invention.

Referring to FIG. 24, the hybrid heat insulation sheet according to a fourth embodiment of the present invention, includes: a spreader 2110 to spread the transferred heat; a guide portion 2150 that is fixed to the heat spreader 2110 in which at least one throughhole 2151 is formed; a phase change material 2120 that is filled in the through-hole 2151 of the guide portion 2150 to thus absorb heat spread from the heat spreader 2110; a cover portion 2130 that surrounds the phase change material 2120 and fixed to the guide portion 2150; and a heat insulator 2140 that blocks the heat conducted from the cover portion 2130 to perform a heat insulation function.

As described above, the hybrid heat insulation sheet according to the fourth embodiment of the present invention is configured to fill the phase change material 2120 into the throughhole 2151 of the guide portion 2150 fixed to the heat spreader 2110, and fix the cover portion 2130 surrounding the phase change material 2120 to the guide portion 2150, to thus prevent the phase change material 2120 from leaking to the outside or being penetrated into the micropores of the heat insulator 2140 when the phase change material 2120 is changed to a liquid phase due to the endothermic reaction by the transferred heat.

In addition, the hybrid heat insulation sheet according to the fourth embodiment of the present invention is also configured to make the heat spreader 2110 spread the transferred heat, the phase change material 2120 absorb the heat, the cover portion 2130 diffuse the heat, and the heat insulator 2140 block the heat while having a heat insulation structure, to thus enhance the heat insulation efficiency.

Meanwhile, the guide portion 2150 may use the same material as that of the heat spreader 2110, but may use other metallic materials differing from that of the heat spreader 2110. However, the guide portion 2150 is most preferably configured to use the same material as that of the heat spreader 2110. That is, the guide portion 2150 and the heat spreader 2110 need to have an identical heat expansion coefficient, to prevent the interface between the guide portion 2150 and the heat spreader 2110 from being peeled off due to the heat passed to the heat spreader 2110.

As shown in FIG. 26, the guide portion 2150 is fixed to the heat spreader 2110, and the throughhole 2151 of the guide portion 2150 is made in a groove shape. Accordingly, the phase change material is filled in the groove created by the throughhole 2151 of the guide portion 2150 and the spreader 2110.

Referring to FIGS. 25A to 25D, the manufacturing method of the hybrid heat insulation sheet according to the fourth embodiment of the present invention includes fixing the guide portion 2150 with at least one throughhole 2151 to the heat spreader 2110 that spreads the transferred heat (FIG. 25A), filling the phase change material 2120 into the throughhole 2151 of the guide portion 2150 (FIG. 25B), surrounding the phase change material 2120, fixing the cover portion 2130 to the guide portion 2150 (FIG. 25C) and then laminating the heat insulator 2140 on the cover portion 2130 (FIG. 25D).

As described above, the hybrid heat insulation sheets according to the third and fourth embodiments of the present invention basically include the heat spreader 2110, the phase change material 2120, the cover portion 2130 and the heat insulator 2140.

The heat spreader 2110 spreads the heat transmitted from the outside. That is, the heat spreader 2110 carries out a function of diffusing heat by preventing the heat generated in the heat generating component, from being concentrated to one place. The heat spreader 2110 preferably uses a copper material or an aluminum material of a high heat conductivity and a low price, and may perform a nickel plating to the heat spreader 2110 of the copper material to address oxidation and corrosion. Then, the thickness of the heat spreader 2110 is preferably 10 μm-40 μm.

The phase change material 2120 delays time of conduction of the heat diffused from the heat spreader 2110 to the heat insulator 2140. The phase change material 2120 absorbs heat to thus delay the heat conduction. That is, the phase change material performs the heat absorbing reaction to absorb heat while the phase change material change from a solid phase to a liquid phase. The phase change material is changed into the solid phase again when the surrounding temperature falls.

When considering an example of a method of manufacturing a phase change material 2120, a phase change material is first powdered, and then the phase change material powder is mixed with a binder and a solvent to thereby form a slurry in which the powder of the phase change material is spread, and the slurry is filmed to prepare a film in which the powder of the phase change material is spread, to thereby apply the film to the phase change material 2120.

In addition, another example of a method of manufacturing the phase change material 2120 is configured by placing a heat spreader 2110 on a hot plate, applying a powder of a phase change material on the top of the heat spreader 2110, creating the powder of the phase change material in a liquid phase at a temperature (e.g., about 65° C.) of the hot plate, and leaving the heat spreader 2110 from the hot plate, to thereby make the phase change material into a film form. The thickness of such a phase change material 2120 is preferably 10 μm-30 μm.

The cover portion 2130 can use a thin metal plate such as an aluminum sheet diffusing the heat conducted from the phase change material 2120.

The heat insulator 2140 blocks the heat conducted from the phase change material 2120. In this case, the heat insulator 2140 is integrated by nanofibers and uses preferably a nanofiber web having a microporous structure. The thickness of the heat insulator 2140 is preferably 5 μm-30 μm.

Thus, the hybrid heat insulation sheets according to the first and second embodiments of the present invention can basically perform the heat diffusion, heat absorption, the heat diffusion, and heat insulation in sequence, to thereby have excellent heat insulation performance, which may be attached to electronic products of high performance, and simultaneously which may reduce thickness of the heat insulation sheet, to thus provide an effect that the hybrid heat insulation sheet can be applied to electronic products including ultra-thin and ultra-slim mobile terminals.

Meanwhile, the nanofiber web is arranged in a three-dimensional network structure in which electrospun nanofibers are irregularly stacked. Irregularly distributed micropores are formed in the nanofiber web by the nanofibers, the micropores trap air to suppress convection of the air to thus perform heat insulation, and heat barrier capability of the nanofiber web is increased by the micropores, to thereby have excellent heat insulation performance.

Thus, the hybrid heat insulation sheets according to the first and second embodiments of the present invention are configured to laminate a structure of a heat spreader that is attached to a heat generating component and diffuses heat generated from the heat generating component, a structure of a phase change material that absorbs the diffused heat and delays time of the absorbed heat, a structure of a cover portion that re-spreads the time delayed heat, and a structure of a heat insulator that blocks the heat, to thus maximize heat insulation efficiency.

When a hotspot takes place since heat is transferred to a localized area of the heat spreader 2110 in the hybrid heat insulation sheet, the heat transmitted from the hotspot is spread throughout the heat spreader 2110.

When the heat transmitted from the hotspot of the heat spreader 2110 is fully saturated in the heat spreader 2110, the heat is transferred to the phase change material 2120. Here, even if the heat is not fully saturated in the heat spreader 2110, the heat is transferred to the phase change material 2120 in close proximity to the hotspot 2111.

The phase change material 2120 absorbs the transferred heat and delays the transfer time of the heat delivered to the cover portion 2130. In other words, the heat transmitted to the phase change material 2120 is absorbed by the phase change material 2120. In this case, the phase change material continuously absorbs the heat for a certain time until the phase change material 2120 is completely changed from the solid phase to the liquid phase, and delays the transfer time of the heat transferred from the phase change material 2120 to the cover portion 2130.

The cover portion 2130 spreads the time-delayed heat to then be transferred to the heat insulator 2140 to block the heat that is transferred to the heat insulator 2140. That is, the heat insulator 2140 made of the nanofiber web includes micropores to block the heat transferred from the heat insulator 2140.

As described above, the hybrid heat insulation sheets according to the third and fourth embodiments of the present invention have a hybrid heat insulation structure that the heat spreader 2110 diffuses the heat transmitted from the heat generating component, the phase change material 2120 absorbs heat to thus time-delay the heat transfer time, to then be transferred to the cover portion 2130, and the cover portion 2130 diffuses the transferred heat, to then be transferred to the heat insulator 2140, and the heat insulator 2140 blocks the transferred heat.

The hybrid heat insulation sheets according to the third and fourth embodiments of the present invention is preferably implemented as a phase change material which changes phase at a lower temperature by 2° C. to 5° C. than a temperature of a heat conducted from the heat spreader 2110 to the phase change material 2120, so that the phase change material 2120 can efficiently exert a latent heat function.

Figure 27A:
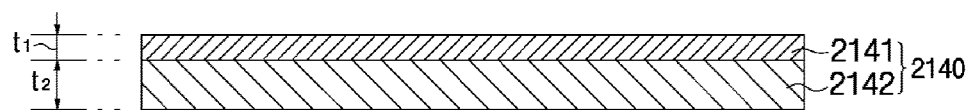
FIGS. 27A and 27B are schematic cross-sectional views respectively illustrating a laminate structure of the nanofiber web and the nonwoven fabric that are applied as a heat insulation portion of a hybrid heat insulation sheet according to the third and fourth embodiments of the present invention.
Figure 27B:
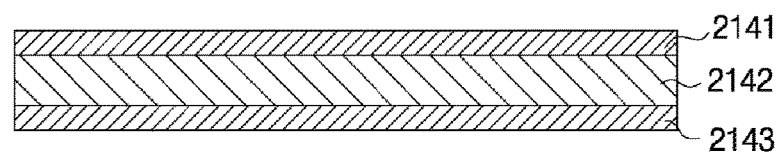

FIGS. 27A and 27B are schematic cross-sectional views respectively illustrating a laminate structure of the nanofiber web and the nonwoven fabric that are applied as a heat insulation portion of a hybrid heat insulation sheet according to the third and fourth embodiments of the present invention.

Referring to FIGS. 27A and 27B, the heat insulators 2140 of the hybrid heat insulation sheets according to the third and fourth embodiments of the present invention can adopt the laminate structure of the nanofiber web 2141 and the nonwoven fabric 2142 (FIG. 27A), or the laminate structure of the nanofiber web 2141/the nonwoven fabric 2142/the nanofiber web 2143 (FIG. 27B). Here, the thickness t1 of the nanofiber web 2141 is preferably thinner than the thickness t2 of the nonwoven fabric 2142.

In this way, when the heat insulator 2140 is implemented in a laminate structure of the nanofiber web 2141 and nonwoven fabric 2142, and since the nonwoven fabric 2142 is less expensive than the nanofiber web 2141 and has the high strength, the manufacturing cost of the hybrid heat insulation sheet can be reduced and the strength thereof can be improved simultaneously. In addition, the nonwoven fabric 2142 has also a large number of pores, and has the ability to block the heat to thus play a role of the heat insulator.

Here, the nanofiber web 2141 and the nonwoven fabric 2142 may be fused due to the thermocompression. In this case, it is preferable that the nanofiber web 2141 is melted to be fused on the nonwoven fabric 2142 due to the heat applied during thermocompression, by designing the melting point of the nanofiber web 2141 to be less than the melting point of the nonwoven fabric 2142. For example, in the case that the polymer material for forming the nanofiber web 2141 employs PVdF, the melting point of PVdF is 155° C., and thus the nonwoven fabric 2142 employs one of polyester-based, nylon-based, and cellulose-based nonwoven fabrics having a melting point higher than 155° C.

Thus, during thermocompression, a region of the nanofiber web 2141 adjacent to the nonwoven fabric 2142 is melted and fused with the nonwoven fabric 2142. Here, the pore size of the nonwoven fabric 2142 is much larger than the pore size of the nanofiber web, and a portion of the melted nanofiber web 2141 is infiltrated into the pores of the nonwoven fabric 2142. That is, based on the boundary surfaces of the nonwoven fabric 2142 and the nanofiber web 2141 before thermocompression, the melted nanofiber web 2141 is spread and distributed in the direction of the nanofiber web 2141 and in the direction of the nonwoven fabric 2142 on the boundary surfaces after the thermocompression. When controlling the level of the amount of the melted nanofiber web 2141 based on these technical features, the nanofiber web 2141 is melted into the pores of the nonwoven fabric 2142 and the nanofiber web 2141 permeated into the pores the nonwoven fabric 2142 performs a locking role to thereby improve the adhesion of the nanofiber web 2141 and the nonwoven fabric 2142.

According to the embodiment of the present invention, a polymer material forming the nanofiber web can employ a polymer material such as a mixture of PVdF and PAN at a ratio of 5 to 5. Here, the electrospun nanofiber is formed of a structure having a core made of PAN, and a cover portion that surrounds an outer peripheral surface of the core and made of PVdF. The nanofibers of this structure are laminated to form the nanofiber web 2141. When the nanofiber web 2141 that is formed by laminating the nanofibers having a structure of the core and the cover portion, is thermally compressed with the nonwoven fabric 2142, PVdF of the cover portion is melted and penetrated into and fused with the nonwoven fabric 2142.

As described above, the present invention has been described with respect to particularly preferred embodiments. However, the present invention is not limited to the above embodiments, and it is possible for one of ordinary skill in the art to make various modifications and variations, without departing off the spirit of the present invention. Thus, the protective scope of the present invention is not defined within the detailed description thereof but is defined by the claims to be described later and the technical spirit of the present invention.

INDUSTRIAL APPLICABILITY

The present invention employs a heat insulation sheet including a phase change material that is capable of absorbing heat thereby increasing the heat insulation efficiency.

The invention claimed is:

1. A hybrid heat insulation sheet comprising:
   a heat insulation sheet including an outer shell with a hollow portion therein, and a phase change material (PCM) that is positioned in the hollow portion and that absorbs heat transferred from the outer shell; and
   at least one reinforcing sheet that is contacting one surface, both surfaces or the entire surface of the heat insulation sheet,
   wherein the reinforcing sheet is a heat radiation member; and
   wherein the heat radiation member comprises a first radiating layer having a first conductivity; and a second radiating layer having a second conductivity bonded on the first radiating layer, and the first conductivity of the first radiating layer is lower than the second conductivity of the second radiating layer, and the first radiating layer is attached to, contacts or approaches a heat generating component.

2. The hybrid heat insulation sheet of claim 1, further comprising an adhesive that is sandwiched and bonded between the heat insulation sheet and the reinforcing sheet.

3. The hybrid heat insulation sheet of claim 2, wherein the adhesive comprises any one of acrylic-based, epoxy-based, aramid-based, urethane-based, polyamide-based, polyethylene-based, EVA-based, polyester-based, and PVC-based adhesives, or a hot melt web, or the adhesive comprises a hot melt powder having a large number of pores formed by accumulating fibers capable of being thermally bonded.

4. The hybrid heat insulation sheet of claim 3, wherein the adhesive comprises a conductive filler for thermal spreading of an aspect ratio of 1:100, and a spherical conductive filler for thermal transfer.

5. The hybrid heat insulation sheet of claim 1, wherein the heat insulation sheet is formed of a structure that includes a heat spreader to spread the transferred heat, a metal thin plate fixed to the heat spreader, and a phase change material positioned between the heat spreader and the metal thin plate, or a structure that includes a heat spreader to spread the transferred heat, a guide portion fixed to the heat spreader in which at least one through-hole is formed, a phase change material filled in the at least one through-hole of the guide portion, and a metal thin plate surrounding the phase change material and fixed to the guide portion.

6. A heat insulation panel comprising: a hybrid heat insulation sheet according to claim 1.

7. A heat insulation panel comprising: a hybrid heat insulation sheet according to claim 2.

8. A heat insulation panel comprising: a hybrid heat insulation sheet according to claim 3.

9. A heat insulation panel comprising: a hybrid heat insulation sheet according to claim 4.

10. A heat insulation panel comprising: a hybrid heat insulation sheet according to claim 5.

* * * * *